Patented Jan. 18, 1949

2,459,763

UNITED STATES PATENT OFFICE 2,459,763

MANUFACTURE OF RUBBER PRODUCTS

Mark M. Heywood, Twickenham, England, assignor to The Firestone Tire & Rubber Company, Akron, Ohio, a corporation of Ohio No Drawing. Application November 15, 1947, Serial No. 786,329. In Great Britain March 26, 1943

Section 1, Public Law 690, August 8, 1946

15 Claims. (Cl. 260—79)

This invention relates to the manufacture of rubber products, and it relates more particularly to the vulcanization of rubber and synthetic rubber compositions and articles comprising the same. This application is a continuation-in-part of my copending aplication Serial No. 551,427, filed August 26, 1944, now abandoned.

The chief objects of the invention are to speed up and improve the action of the thiazole-type of rubber vulcanization accelerators, to provide vulcanized natural and synthetic rubbery compositions of improved physical properties, and to provide a commercially practical method of vulcanizing rubbery articles by the use of much smaller proportions of accelerator than are commonly used. Other objects will be readily apparent in the description of the invention which follows.

The objects of the invention are realized by adding to the vulcanizable rubbery composition an addition compound of cyclohexylamine or dicyclohexylamine and a cresol or a hydrocarbon-substituted cresol. Examples of suitable cresol derivatives are o-, m-, and p-cresol, homologs of cresols, such as the xylenols, t-butylphenol, octylphenol, decylphenol, and other hydrocarbon-substituted cresols such as benzylated cresols and the like. Although these addition compounds, or substituted ammonium salts, are not very effective vulcanization accelerators when used alone, they substantially intensify the accelerating activity of thiazole-type accelerators.

Suitable accelerators conform to the general formula Tz D, wherein Tz represents a thiazyl radical and D represents a mercapto or substituted mercapto radical of the group, —SH, —SSTz, —SNR$_2$, and —SH·NR$_3$, it being understood that R may represent hydrogen or a hydrocarbon substituent. Examples are mercaptobenzothiazole, ethylthiazylmercaptan, dimethyl thiazyl mercaptan, the amine salts, disulfides and sulfenamide derivatives thereof.

The invention is applicable to all natural and synthetic rubbery compositions which may be vulcanized by sulfur. These include natural rubber, reclaimed rubber, polyisoprene, polybutadiene, copolymers of 1,3-butadiene with styrene or acrylonitrile, and other vulcanizable rubbery polymers of two or more monomers, one of which is a conjugated diolefin.

The addition compounds of the invention may be used in various proportions, e. g., from 0.1 to 5.0 parts per 100 parts of rubber. The thiazole-type accelerator may be employed in the same range of proportions, but less of the accelerator than usual is employed with increasing proportions of the cyclohexylamine-cresol addition compound.

The invention is further disclosed in the following examples, in which all parts are by weight.

EXAMPLE 1

Cyclohexylammonium cresylate was prepared by mixing equimolecular quantities of cyclohexylamine and cresol with cooling. The reaction product was tested as an accelerator-activator and improver of the sulfenamide-type commercial accelerator, N-cyclohexyl-2-benzothiazyl sulfenamide, in a commercial rubbery copolymer of 1,3-butadiene and styrene. Accordingly, control and test compositions were mixed in conformity with Table 1.

Table 1

| Ingredients | Parts by Weight | |
|---|---|---|
| | Control | Test |
| Rubbery copolymer of butadiene and styrene | 100 | 100 |
| Stearic acid | 2.5 | 2.5 |
| Pine tar | 2.6 | 2.6 |
| Zinc oxide | 2.4 | 2.4 |
| Carbon black | 45.0 | 45.0 |
| Antioxidant | 0.6 | 0.6 |
| Sulfur | 1.7 | 1.7 |
| Coal tar distillate softener | 4.0 | 4.0 |
| N-cyclohexyl-2-benzothiazyl sulfenamide | 1.2 | 0.9 |
| Cyclohexylammonium cresylate | | 2.0 |
| Total | 160.0 | 161.7 |

Samples of the two compositions mixed in accordance with the formulas of Table 1 were cured by heating at 20, 40, 60 and 160 minutes at 280° F., and modulus and tensile data were obtained on the vulcanizates, as set out in Table 2.

*Table 2*

| Vulcanized Composition | Modulus of elasticity in lbs./in.² at elongation of 300% | | | | Tensile strength in lbs./in.² at break | | | |
|---|---|---|---|---|---|---|---|---|
| Cure in minutes | 20 | 40 | 80 | 160 | 20 | 40 | 80 | 160 |
| Control | 150 | 450 | 850 | 980 | 250 | 2,150 | 2,850 | 2,750 |
| Test | 525 | 725 | 900 | 825 | 2,425 | 2,950 | 2,980 | 2,800 |

One of the disadvantages of vulcanized rubbery copolymers of butadiene and styrene is that if a cut is made in a vulcanized block of the vulcanized copolymer and the area containing the cut is subjected to flexing, the cut increases in length much more quickly than would be the case with natural rubber. However, the inclusion of a cyclohexylammonium cresylate or a dicyclohexylammonium cresylate in the copolymer prior to vulcanization reduces the propensity of the vulcanizate to cut growth, as will be apparent from an examination of Table 3, wherein there are shown results of flexing tests carried out on blocks of the two compositions mixed in accordance with Table 1; each test block was provided with a slit 0.1 inch deep and 0.2 inch long; the slit test blocks were flexed for one hour.

*Table 3*

| Cure of test blocks | Increase in length of slit at end of test | |
|---|---|---|
| | 80 minutes at 280° F. | 80 minutes at 298° F. |
| | *Inches* | *Inches* |
| Control composition | 0.090 | 0.102 |
| Test composition | 0.054 | 0.081 |

Continued flexing under load shows that butadiene-styrene copolymer compositions generate more heat than natural rubber, and in consequence decompose. A means of indirect measurement of the heat generated is the time a block of butadiene-styrene copolymer vulcanizate will stand continued compression and decompression without decomposition. The longer the time, the better is the product.

Using the two compositions prepared in accordance with Table 1 and vulcanized, the following test results were obtained:

Control composition: Time, 18 minutes to decomposition.

Test composition: Time, 21 minutes to decomposition.

EXAMPLE 2

An additional quantity of cyclohexylammonium cresylate was prepared by adding 184.3 grams of cyclohexylamine to 201 grams of commercial mixed cresols (mole/mole) with constant stirring and cooling in an ice bath. The addition was carried out over a period of one and one-half hours at a temperature of 15 to 20° C. The yield was 281 grams of a wine colored liquid.

The cyclohexylammonium cresylate was tested in a butadiene-styrene copolymer tire tread formula slightly different from the formula of Table 1, in order to determine whether or not a smaller proportion of the thiazole-type accelerator could successfully be used. Control and test compositions were mixed in accordance with the formulas of Table 4, and the various physical tests results set out therein for these test compositions show that equal or improved properties resulted from use of only one-third of the amount of thiazole-type accelerator normally used, when the activator of the invention was employed.

*Table 4*

| Formulas | Control | Test |
|---|---|---|
| Butadiene-styrene copolymer | 100 | 100 |
| Asphalt plasticizer | 10 | 10 |
| Carbon Black | 50 | 50 |
| Zinc oxide | 5 | 5 |
| Sulfur | 2.5 | 2.5 |
| N-cyclohexyl-2-benzothiazyl sulfenamide | 0.75 | 0.25 |
| Cyclohexylammonium cresylate | | 2.0 |
| Total | 168.25 | 169.75 |
| Modulus at 300% in lbs./in.²: | | |
| Cured 20 min. at 280° F | 975 | 975 |
| Cured 40 min. at 280° F | 1,175 | 1,050 |
| Cured 80 min. at 280° F | 1,250 | 1,125 |
| Cured 160 min. at 280° F | 1,225 | 1,150 |
| Tensile strength in lbs./in.²: | | |
| Cured 20 min. at 280° F | 2,100 | 2,200 |
| Cured 40 mins. at 280° F | 1,875 | 1,875 |
| Cured 80 min. at 280° F | 1,675 | 1,875 |
| Cured 160 min. at 280° F | 1,800 | 2,100 |

FLEXOMETER [1] "BLOWOUT TEST"—TEST BLOCKS CURED 80 MIN. AT 280° F.

| Minutes to decomposition | 29 | 48 |
|---|---|---|
| Cut growth resistance—relative: | | |
| Blocks cured 80 min. at 280° F | 100 | 217 |
| Blocks cured 80 min. at 298° F | 112 | 168 |

[1] Flexometer disclosed in U. S. Pat. 2,048,314. Test block is placed on revolvable plate under a load of 550 pounds. Plate is off-set 0.4 inch from center and revolved rapidly until block is deflected or compressed 0.3 inch below original height under the load, at which time block is considered decomposed or blown out.

EXAMPLE 3

The activator of Example 2 was tested with the thiazole-type accelerator, the cyclohexylamine salt of mercaptobenzothiazole, in the butadiene-styrene copolymer test formula used in Example 2. As a sort of "control" composition, the test composition of Example 2 was employed and is herein referred to as "Test composition 2." The "Test composition 3" of this example was identical with Test composition 2 excepting in the weight-for-weight replacement of the sulfenamide by the cyclohexylamine salt of mercaptobenzothiazole. Test results are given in Table 5.

*Table 5*

| | Test Composition 2 | Test Composition 3 |
|---|---|---|
| Modulus at 400% in lbs./in.²: | | |
| Cured 20 min. at 280° F | 725 | 775 |
| Cured 40 min. at 280° F | 1,100 | 1,200 |
| Cured 80 min. at 280° F | 1,225 | 1,300 |
| Cured 160 min. at 280° F | 1,550 | 1,525 |
| Tensile strength in lbs./in.²: | | |
| Cured 20 min. at 280° F | 1,775 | 1,600 |
| Cured 40 min. at 280° F | 2,275 | 1,650 |
| Cured 80 min. at 280° F | 1,650 | 1,600 |
| Cured 160 min. at 280° F | 2,200 | 1,775 |

[1] FLEXOMETER BLOW-OUT TEST

| Minutes to decomposition | 44 | 53 |
|---|---|---|

[1] Same test and conditions as in Table 4.

EXAMPLE 4

The activator of the invention was tested in a natural rubber "gum stock," in accordance with the formulas of Table 6, wherein the normal physical testing data are presented.

Table 6

| Formulas | Control | Test |
|---|---|---|
| Natural rubber | 100 | 100 |
| Sulfur | 6.65 | 6.65 |
| Zinc oxide | 11.4 | 11.4 |
| Stearic acid | 1.9 | 1.9 |
| Mercaptobenzothiazole | 0.95 | 0.95 |
| Cyclohexylammonium cresylate | | 0.12 |
| Total | 120.90 | 121.02 |
| Modulus in lbs./in.² at 600%: | | |
| Cured 30 min. at 260° F | 804 | 1,300 |
| Cured 60 min. at 260° F | 1,072 | 1,237 |
| Cured 90 min. at 260° F | 1,050 | 1,050 |
| Tensile strength in lbs./in.²: | | |
| Cured 30 min. at 260° F | 2,917 | 3,630 |
| Cured 60 min. at 260° F | 3,030 | 3,290 |
| Cured 90 min. at 260° F | 2,877 | 3,003 |
| Percent elongation at break: | | |
| Cured 30 min. at 260° F | 809 | 771 |
| Cured 60 min. at 260° F | 775 | 759 |
| Cured 90 min. at 260° F | 767 | 750 |

EXAMPLE 5

The activator of the invention was tested in a natural rubber tire tread composition, in accordance with the formulas of Table 7, wherein physical testing data are presented which show the activator to be effective with a sulfenamide accelerator, even when present in a minor proportion.

Table 7

| Formula | Control | Test |
|---|---|---|
| Rubber | 100 | 100 |
| Carbon black | 49.0 | 49.0 |
| Zinc oxide | 3.0 | 3.0 |
| Stearic acid | 3.0 | 3.0 |
| Liquid plasticizer | 4.0 | 4.0 |
| Antioxidant | 2.0 | 2.0 |
| Sulfur | 2.25 | 2.25 |
| N-cyclohexyl-2-benzothiazyl sulfenamide | 1.0 | 1.0 |
| Cyclohexylammonium cresylate | | 0.25 |
| | 164.25 | 164.50 |
| Modulus in lbs./in.² at 300%: | | |
| Cured 10 min. at 280° F | Uncured | 817 |
| Cured 15 min. at 280° F | 758 | 957 |
| Cured 30 min. at 280° F | 1,375 | 1,585 |
| Cured 45 min. at 280° F | 1,390 | 1,592 |
| Tensile strength in lbs./in.²: | | |
| Cured 10 min. at 280° F | Uncured | 4,430 |
| Cured 15 min. at 280° F | 4,623 | 4,613 |
| Cured 30 min. at 280° F | 4,537 | 3,900 |
| Cured 45 min. at 280° F | 4,087 | 3,657 |

Durometer hardness (*test piece cured 15 min. at 280° F.*)

Control _____ 50
Test _____ 55

EXAMPLE 6

The activator of the invention was tested in a butadienestyrene copolymer tread composition accelerated with a dithiazyl disulfide, in accordance with Table 8.

Table 8

| Formula | Control | Test |
|---|---|---|
| Butadiene-styrene copolymer | 100 | 100 |
| Stearic acid | 2.5 | 2.5 |
| Coal tar distillate | 4.0 | 4.0 |
| Petroleum distillate residue | 2.6 | 2.6 |
| Antioxidant | 0.6 | 0.6 |
| Carbon black | 45.0 | 45.0 |
| Zinc oxide | 2.4 | 2.4 |
| Sulfur | 1.7 | 1.7 |
| Dibenzothiazyl disulfide | 1.6 | 1.6 |
| Cyclohexylammonium cresylate | | 2.0 |
| Total | 160.4 | 162.4 |
| Modulus in lbs./in.² at 400%: | | |
| Cured 20 min. at 280° F | 925 | 1,350 |
| Cured 40 min. at 280° F | 1,375 | 1,700 |
| Cured 80 min. at 280° F | 1,625 | 2,025 |
| Cured 160 min. at 280° F | 1,725 | 2,025 |
| Tensile strength in lbs./in.²: | | |
| Cured 20 min. at 280° F | 2,525 | 3,125 |
| Cured 40 min. at 280° F | 2,425 | 2,350 |
| Cured 80 min. at 280° F | 2,625 | 2,425 |
| Cured 160 min. at 280° F | 2,625 | 2,125 |

EXAMPLE 7

The activator of the invention was tested in a butadienestyrene copolymer tread formula accelerated by a thiazyl mercaptan, in accordance with Table 9.

Table 9

| Formula | Control | Test |
|---|---|---|
| Butadiene-styrene copolymer | 100 | 100 |
| Stearic acid | 2.5 | 2.5 |
| Coal tar distillate | 4.0 | 4.0 |
| Petroleum distillate residue | 2.6 | 2.6 |
| Antioxidant | 0.6 | 0.6 |
| Carbon black | 45.0 | 45.0 |
| Zinc oxide | 2.4 | 2.4 |
| Sulfur | 1.7 | 1.7 |
| Mercaptobenzothiazole | 1.6 | 1.6 |
| Cyclohexylammonium cresylate | | 2.0 |
| Total | 160.4 | 162.4 |
| Modulus in lbs./in.² at 400%: | | |
| Cured 20 min. at 280° F | 100 | 1,700 |
| Cured 40 min. at 280° F | 350 | 2,000 |
| Cured 80 min. at 280° F | 950 | 2,200 |
| Cured 160 min. at 280° F | 1,550 | 2,300 |
| Tensile strength in lbs./in.²: | | |
| Cured 20 min. at 280° F | 200 | 2,625 |
| Cured 40 min. at 280° F | 1,350 | 2,450 |
| Cured 80 min. at 280° F | 2,400 | 2,600 |
| Cured 160 min. at 280° F | 2,600 | 2,600 |

The above examples show the consistent activating effect of the cyclohexylamine addition compound with cresol upon several commercial thiazole-type accelerators, in both natural and synthetic rubbers. The activator improves the aging resistance of both natural and synthetic rubber vulcanized in its presence, and it also allows a substantial reduction in the proportion of the relatively expensive thiazole-type accelerator, resulting in appreciable savings for equivalent performance of both natural and synthetic rubber compositions. The equivalent activators mentioned hereinabove, namely, the cyclohexylammonium salts of hydrocarbon substituted cresols and the dicyclohexylammonium salts of cresol or hydrocarbon substituted cresols, may be substituted for the preferred activator in the various examples with equivalent improved results.

It has been observed that large changes in the physical properties of vulcanizates result from slight variations in proportions of sulfur or accelerator, such that a variation of 0.1 part per 100 parts of rubber causes substantial changes in vulcanizate properties. In contrast, the proportion of the activator of the invention may be varied widely, as from 1.0 to 2.0 parts per 100 of rubber with only minor or unmeasurable differences in physical properties of the vulcanizate. A possible explanation of this advantageous phenomenon is the fact that cyclohexylammonium cresylate is a solvent for sulfur, and thus an efficient dispersant therefor.

What is claimed is:

1. Method of vulcanizing a substance of the group consisting of natural rubber, reclaimed rubber and synthetic rubbery conjugated diolefin polymers, which includes heating the substance and sulfur in the presence of a thiazole accelerator and an activator of the class consisting of cyclohexylammonium and dicyclohexylammonium salts of a cresol.

2. Method of vulcanizing a substance of the group consisting of natural rubber, reclaimed rubber and synthetic rubbery conjugated diolefin polymers, which includes heating the substance and sulfur in the presence of a thiazyl mercaptan accelerator and cyclohexylammonium cresylate.

3. Method of vulcanizing a substance of the group consisting of natural rubber, reclaimed rubber and synthetic rubbery conjugated diolefin polymers, which includes heating the substance and sulfur in the presence of a dithiazyl disulfide accelerator and cyclohexylammonium cresylate.

4. Method of vulcanizing a substance of the group consisting of natural rubber, reclaimed rubber and synthetic rubbery conjugated diolefin polymers, which includes heating the substance and sulfur in the presence of a thiazyl sulfenamide accelerator and cyclohexylammonium cresylate.

5. A vulcanizable rubber composition including a substance of the group consisting of natural rubber, reclaimed rubber and synthetic rubbery conjugated diolefin polymers, sulfur, a thiazole accelerator and an activator of the class consisting of cyclohexylammonium and dicyclohexylammonium salts of a cresol.

6. A vulcanizable rubber composition including a substance of the group consisting of natural rubber, reclaimed rubber and synthetic rubbery conjugated diolefin polymers, sulfur, a thiazyl mercaptan accelerator and cyclohexylammonium cresylate.

7. A vulcanizable rubber composition including a substance of the group consisting of natural rubber, reclaimed rubber and synthetic rubbery conjugated diolefin polymers, sulfur, a dithiazyl disulfide accelerator and cyclohexylammonium cresylate.

8. A vulcanizable rubber composition including a substance of the group consisting of natural rubber, reclaimed rubber and synthetic rubbery conjugated diolefin polymers, sulfur, a thiazyl sulfenamide accelerator and cyclohexylammonium cresylate.

9. Product of claim 1.
10. Product of claim 2.
11. Product of claim 3.
12. Product of claim 4.

13. The method of making a vulcanizable composition, comprising mixing a rubbery copolymer of butadiene and styrene with sulfur, N-cyclohexyl-2-benzothiazyl sulfenamide and cyclohexylammonium cresylate.

14. A vulcanizable composition comprising a rubbery copolymer of butadiene and styrene, sulfur, N-cyclohexyl-2-benzothiazyl sulfenamide and cyclohexylammonium cresylate.

15. A product produced by vulcanizing the vulcanizable composition claimed in claim 14.

MARK M. HEYWOOD.

REFERENCES CITED

The following references are of record in the file of this patent:

UNITED STATES PATENTS

| Number | Name | Date |
|---|---|---|
| 2,367,827 | Smith | Jan. 23, 1945 |